United States Patent [19]

Honda

[11] Patent Number: 5,642,905
[45] Date of Patent: Jul. 1, 1997

[54] AIRBAG APPARATUS FOR VEHICLE

[75] Inventor: Kiyoshi Honda, Wako, Japan

[73] Assignee: Honda Giken Kogyo Kabushiki Kaisha, Tokyo, Japan

[21] Appl. No.: 511,053

[22] Filed: Aug. 3, 1995

[30] Foreign Application Priority Data

Oct. 8, 1994 [JP] Japan ................................ 6-208207

[51] Int. Cl.⁶ ........................................... B60R 21/16
[52] U.S. Cl. ............................... 280/743.2; 280/741
[58] Field of Search ....................... 280/743.1, 743.2, 280/729, 741, 732

[56] References Cited

U.S. PATENT DOCUMENTS

| | | | |
|---|---|---|---|
| 3,797,855 | 3/1974 | Wright | 280/743.2 |
| 3,929,350 | 12/1975 | Pech | 280/729 |
| 4,153,273 | 5/1979 | Risko | 280/732 |
| 5,350,188 | 9/1994 | Sato | 280/743.2 |

FOREIGN PATENT DOCUMENTS 5-201302  8/1993  Japan.

*Primary Examiner*—Paul N. Dickson
*Attorney, Agent, or Firm*—Armstrong Westerman Hattori McLeland & Naughton

[57] ABSTRACT

An airbag apparatus for a vehicle in which the installing work is simple, the weight is light and there is no fear of unnecessary gas leakage on inflation of the airbag is provided. In an airbag apparatus for a vehicle having an airbag inflated by a gas flowing out from an inflator when a deceleration of the vehicle exceeds a predetermined value for protecting an occupant in the vehicle, the inflator is held in the airbag and fixed to an elongated member with at least one end fixed to an inner surface of the airbag.

4 Claims, 4 Drawing Sheets

AIRBAG APPARATUS FOR VEHICLE

BACKGROUND OF THE INVENTION

This invention relates to an airbag apparatus for a vehicle such as an automobile, particularly to a construction for installing an inflator in the apparatus.

A customary airbag apparatus for an automobile generally has a construction as shown in FIG. 1 sketchily and disclosed in Japanese Laid-Open Patent Publication HEI 5-201302 for example.

In the apparatus, an airbag 01 is fixed to a retainer 02, folded up and housed in a cover capable of opening.

And an inflator 03 which is a gas generator is pushed into the airbag 01 folded up within the cover through an opening portion of the retainer 02 and fixed to the airbag together with the retainer 02 or singly.

A portion of the airbag 01 to which the retainer 02 is fixed serves also as a fixing portion of the inflator 03, and there is provided a fixing member 04 such as a reinforce cloth or a flame-proof cloth on the inner surface of the portion. Suspension strings 05 each with an end fixed to the fixing member 04 extend within the airbag 01 and the outer end of the string 05 is fixed to an apex portion of the airbag facing to the fixing member 04 where a man comes to contact with when the airbag is inflated. The suspension strings 05 prescribe the shape of the inflated airbag.

When the inflator acts to generate a gas within the airbag 01, the airbag 01 expands to the outside tearing the cover due to its inner pressure and develops into a predetermined shape prescribed by the suspension strings 05.

Since the inflator 03 is fixed to the retainer 02 directly or indirectly as described above, it is necessary to select a construction and a material for the retainer 02 capable of enduring reaction force, heat or the like under action of the inflator 03, and therefore the cost of the retainer increases.

Further, when the inflator is attached to the retainer, a complicated progress of work such as tightening by screw is needed and since various parts for attachment is necessary the weight is increased. In addition, sealing against a gas leakage from a portion where the inflator 03 is fixedly contacted with the retainer 02 is also complicated and there is a fear that an unnecessary gas leakage on inflation of the airbag may make the inflation incomplete.

SUMMARY OF THE INVENTION

The present invention has been invented in view of the foregoing points and it is an object of the present invention to provide cheaply an airbag apparatus for a vehicle in which the installing work is simple, the weight is light and there is no fear of unnecessary gas leakage on inflation of the airbag.

In order to achieve the above object, according to the present invention, there is provided an apparatus for a vehicle having an airbag inflated by a gas flowing out from an inflator when a deceleration of the vehicle exceeds a predetermined value for protecting an occupants the vehicle, comprising an elongated member with at least one end fixed to an inner surface of said airbag, said inflator being fixed to said elongated member and held in said airbag.

In the airbag apparatus of the invention, since the inflator is held in the airbag being tied to the elongated member and not fixed to a retainer or the like, a particular retainer for fixing the inflator and a complicated working step for attaching the inflator such as screw tightening step are unnecessary, so that the airbag apparatus is light weight and cost of the apparatus can be attempted.

Also, since an edge of a base end side of the airbag can be sealed, it is not feared that a gas leakage occurs at a portion for attaching the inflator, and the airbag is inflated without leakage.

Further, if a suspension string is utilized as the elongated member, a number of parts can be further reduced.

DETAILED DESCRIPTION OF THE PREFERRED EMBODIMENT

Hereinafter, a preferred embodiment of the invention shown in FIGS. 2 to 5 will be described, first.

Figure 1:
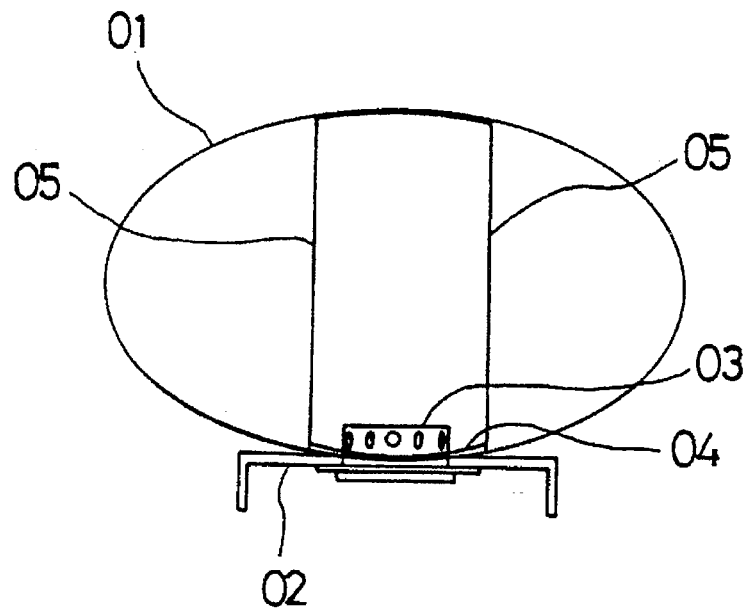
FIG. 1 is a view showing a customary prior arts airbag apparatus sketchily.
Figure 2:
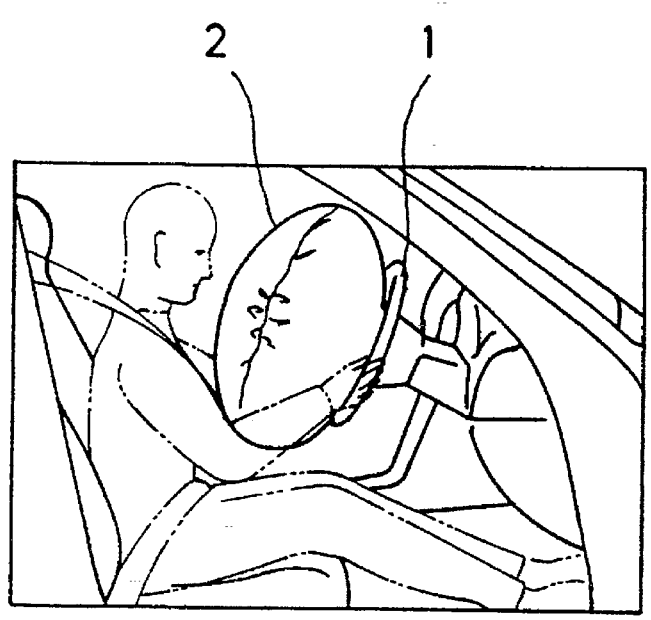
FIG. 2 is a view showing a driver's seat of a vehicle applied with an airbag apparatus according to a preferred embodiment of the invention.

The airbag apparatus of the embodiment is one for a driver's seat and FIG. 2 shows a state of a driver's seat in an automobile wherein an airbag 2 which had been held at a center portion of a sterring wheel 1 and covered by a cover is inflated.

When an acceleration sensor detects a deceleration due to a collision, an inflator acts and generates gas to inflate the airbag 2 which is held folded, the airbag 2 tears the cover and inflates in a shape of a thick disk in front of steering wheel 1 for stopping and protecting the face or the like of the driver.

After completion of the inflation of the airbag, the gas is quickly exhausted through a vent hole of the airbag so as to lessen repulsion by the airbag and soften a shock to the face or the like of the driver.

Figure 3:
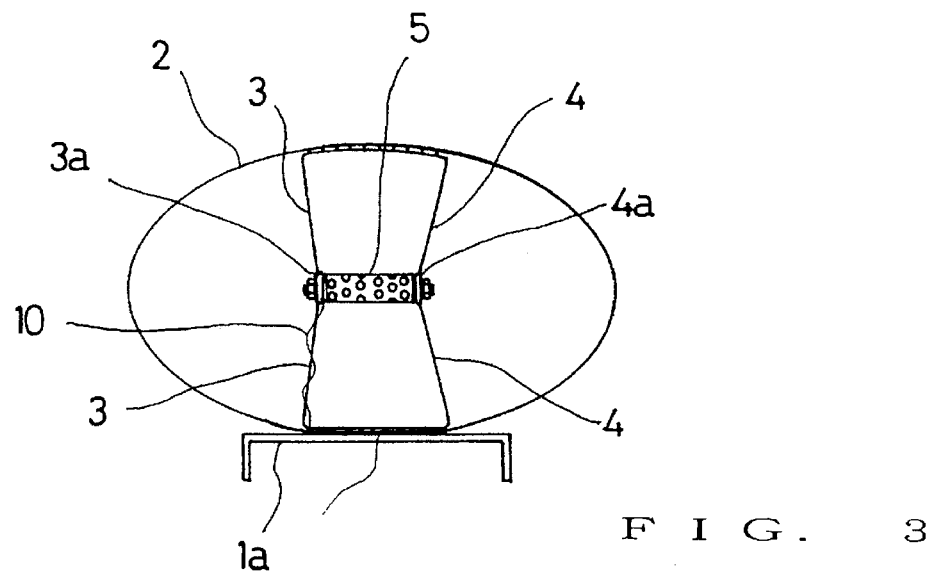
FIG. 3 is a view showing the same airbag apparatus sketchily.

FIG. 3 is a sketch of the airbag apparatus when it is inflated.

A base end portion of the airbag 2 is fixed to a fixing member 1a on the steering wheel 1 side. Within the airbag 2 extend suspension strings 3, 4. One end of each of the suspension strings 3, 4 is fixed to the inner surface of the airbag 2 at the base end side and the other end of each of the suspension strings 3, 4 is fixed to the inner surface at an apex side.

Figure 4:
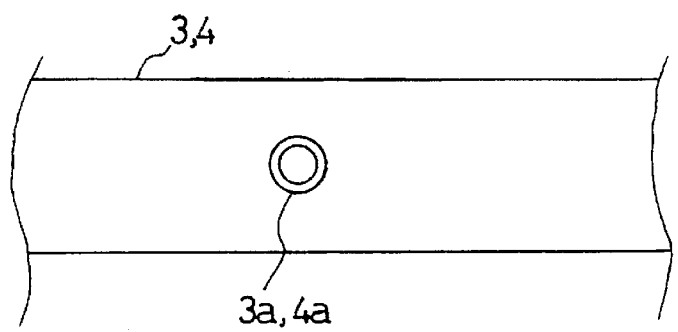
FIG. 4 is a view showing an attachment ring provided on a middle of a suspension string.

As shown in FIG. 4, on a middle portion of the suspension string 3(4) which is formed like a band, an annular attachment ring 3a(4a) is fixed through an eyelet and an inflator 5 is attached to the string with the attachment ring 3a(4a).

The suspension strings 3, 4 are composed of an endless string which is fixedly sewed at corresponding two portions to the base end side and apex side inner surfaces of the airbag 2 so as to form a pair of spaced strings 3, 4.

The inflator 5, used in this case, is constructed by holding an electric igniter and a gas generating agent within a cylindrical case 6 having many gas discharging holes.

Figure 5:
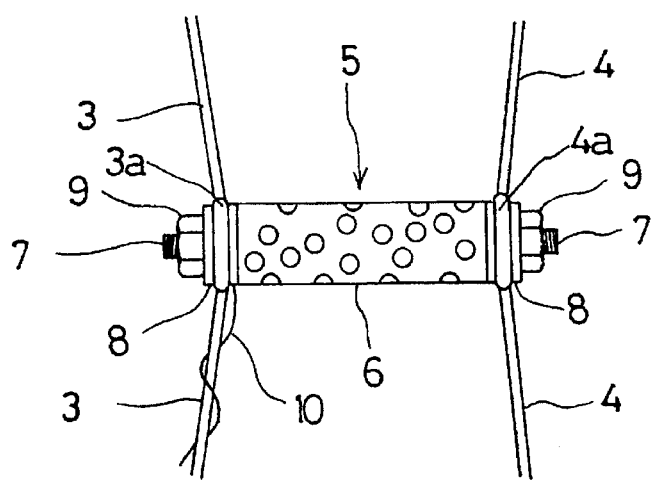
FIG. 5 is an enlarged view of an essential part of the inflator for showing its state of attachment.

As shown in FIG. 5, the cylindrical case 6 has screw rods 7 projecting from the both end faces. The attachment rings 3a, 4a of the suspension strings 3, 4 are abutted against the both end faces of the case 6, nuts 9 are screwed on the screw rods 7 with washers 8 between the nuts and the end faces, and thus the attachment rings 3a, 4a are fixed to the both ends of the inflator 5. When the airbag is inflated, the inflator 5 is hung from the suspension strings 3, 4 supporting both ends of the inflator.

A lead wife 10 extends from the inflator 5 toward the base end side of the airbag 2 along the suspension string 3 and is drawn out of the airbag 2.

Because there is provided a vent hole at the base end side of the airbag 2 for exhausting air after inflation of the airbag, the lead wire 10 may be drawn out through the vent hole. The lead wire 10 supplies electricity to a heater for activating the inflator 5.

On assembling the airbag apparatus, the suspension strings 3, 4 with both ends fixed to the base end side and the apex side of the inner surface of the airbag 2 and previously provided with the attachment rings 3a, 4a in the middle portions are first taken out through an opening at the base end side of the airbag which also acts as an inflator inserting hole, the attachment rings 3a, 4a thus taken out is attached to the both ends of the inflator by means of the nuts 9 in the manner as described above, and the inflator 5 is pressed in the airbag 2 through the above-mentioned opening before closing the opening while only the lead wire 10 is kept to pass through the opening to be closed from inner side to outer side.

The opening of the airbag 2 is easily sealed in this manner and the closed base end side of the airbag 2 is fixed to the fixing member of the steering wheel 1.

Since the inflator 5 is not fixed to any particular fixing member of the steering wheel side such as a retainer or the like, a complicated work such as a screw tightening work or the like is unnecessary for attaching the inflator 5 and therefore an airbag apparatus of light weight and low cost can be obtained.

Closing of the opening of the airbag 2 is also easy and reliable so that there is no fear of gas leakage when the airbag is inflated.

Since the inflator 5 is hung at a nearly central position in the airbag 2 by means of the suspension strings 3, 4 on inflation of the airbag, the gas from the inflator 5 flows evenly in the airbag 2.

In the present embodiment, the suspension strings 3, 4 prescribing the shape of the airbag on inflation of the airbag are utilized for supporting the inflator 5 to reduce a number of parts.

Though the inflator is fixed to the suspension strings 3, 4 so as to position at a nearly central position of the airbag 2, the position of the inflator is not necessarily limited to the central position but it may be a position near the base end or the apex.

Figure 6:
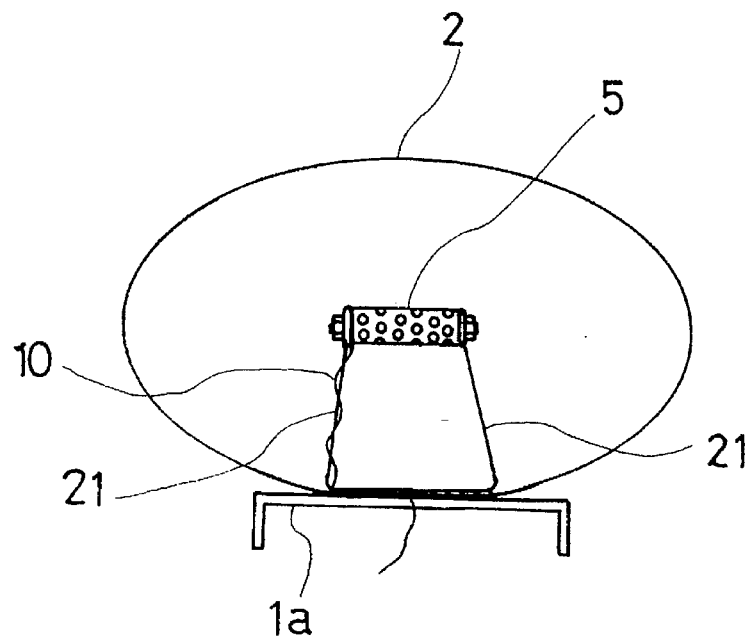
FIG. 6 is a view showing an airbag apparatus according to another embodiment sketchily.

FIG. 6 shows another embodiment of the invention. This embodiment corresponds to the above-described embodiment in which the suspension strings 3, 4 lacks portions extending toward the apex side from the inflator 5 and in FIGS. 5 and 6 the same member is denoted by the same symbol.

Namely, strings 20, 21 fixed to the inflator 5 and extending from the base end side of the airbag 2 are not suspension strings describing the shape of the airbag 2 on its inflation, but mere strings for positioning the inflator 5 at the nearly central position in the airbag 2 to flow the gas from the inflator evenly in the airbag.

Figure 7:
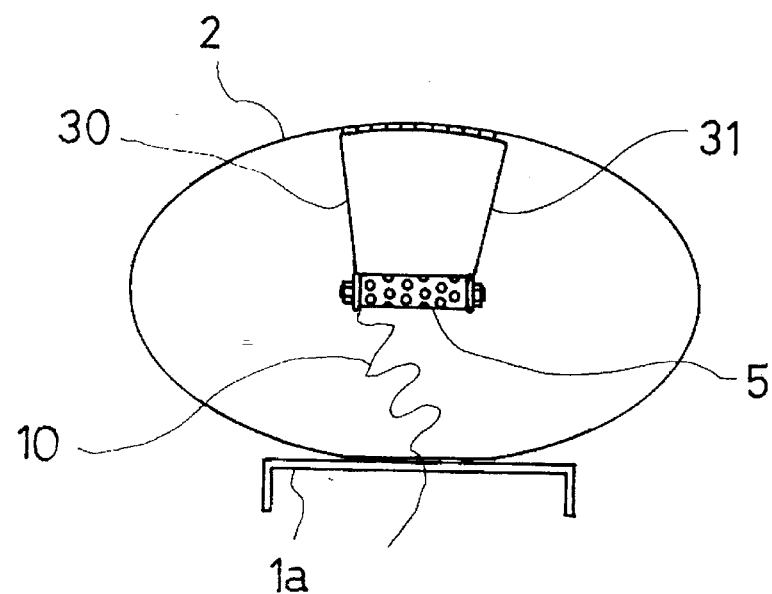
FIG. 7 is a view showing an airbag apparatus according to further another embodiment sketchily.

In FIG. 7 showing further another embodiment, strings 30, 31 fixed to the both ends of the inflator 5 extend from the apex side of the airbag 2 contrary to FIG. 6. In case of FIG. 7 too, the strings 30, 31 are not suspension strings, but strings for positioning the inflator 5 at the nearly central position in the airbag 2 to flow the gas from the inflator 5 evenly in the airbag 2.

The lead wire 10 extending from the inflator 5 is not along the strings 30, 31 but extends toward the base end side of the airbag 2 with a margin and out of the airbag 2.

Figure 8:
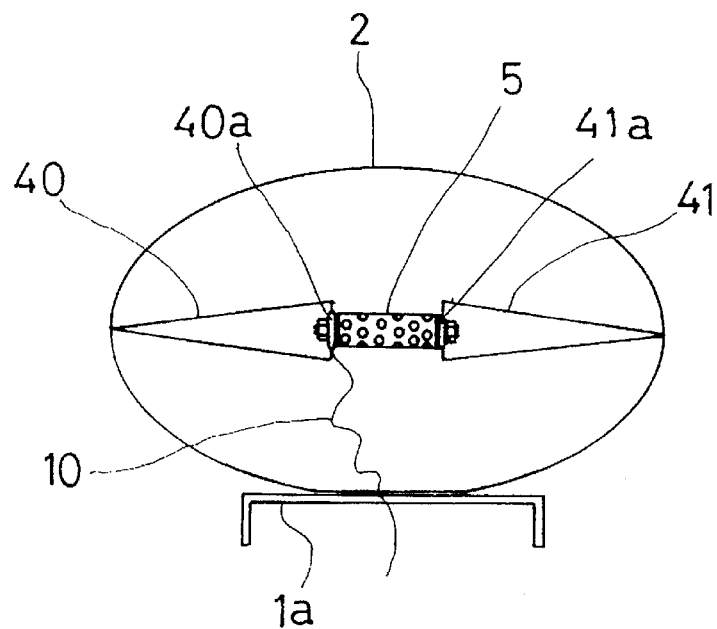
FIG. 8 is a view showing an airbag apparatus according to other embodiment sketchily.

In an example shown in FIG. 8, two separate strings 40, 41 extend from opposite inner surfaces of the airbag 2 at a connecting zone between the base end side and the apex side, that is, at a circumferential zone of the maximum diameter, and are fixed to both ends of the inflator 5 respectively. The strings 40, 41 have attachment rings 40a, 41a at their inner ends for fixing the both ends of the inflator and their outer ends are fixed to the inner surface of the airbag 2 at symmetrical positions.

Therefore, when the airbag is inflated, the ends of the inflator 5 are pulled in opposite directions by the strings 40, 41 and the inflator 5 is supported at the nearly central position in the airbag 2 in a state that it is suspended in midair.

Figure 9:
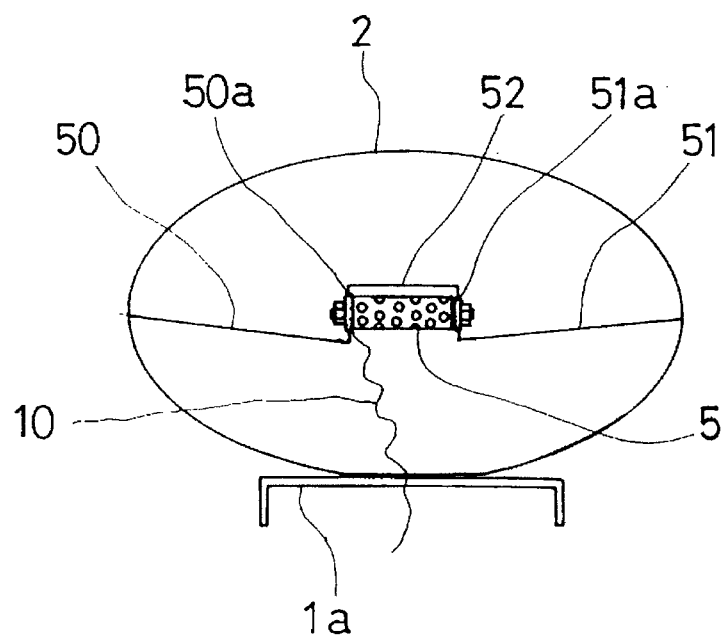
FIG. 9 is a view showing an airbag apparatus according to further other embodiment sketchily.

In FIG. 9 showing a modification of FIG. 8, strings 50, 51 fixed to both ends of the inflator 5 are connected by an intermediate connecting portion 52 to form a continuous string and at the middle of the continuous string are provided two attachment rings 50a, 51a at a predetermined interval. Outer ends of the strings 50, 51 are fixed to opposite inner surfaces of the airbag 2 at the circumferential zone of the maximum diameter.

Therefore, similarly to the case of FIG. 8, when the airbag is inflated the ends of the inflator 5 are pulled in opposite directions by the strings 50, 51 and the inflator is supported at the nearly central position in the airbag 2 in a state that it is suspended in midair.

Since the connecting portion 52 is provided so as to cover the front of the inflator 5, gas flowing forward from the inflator 5 is restrained by the connecting portion 52 and a thrust by gas flowing rearward (toward the base end side of the airbag) acts to push the inflator 5 forward. Owing to the forward movement of the inflator 5 caused by the thrust, a cover covering the airbag is broken in an early time of the inflator action so that the inflation of the airbag can be quickened.

Of course, a member corresponding to the connecting portion 52 can be provided in other embodiments than that of FIG. 9 to obtain the same effect by restraining forward gas flow from the inflator 5.

Also, the thrust to cause the forward movement of the inflator 5 can be obtained by providing the inflator with more gas discharging holes partially on the rear side (the side facing the base end side of the airbag) than the front side, and the same effect as the above can be expected by doing so.

While the airbag apparatus of the above-described embodiments are those for driver's seats, the apparatus can be also applied to other seats. At that time the airbag apparatus may be installed on an instrument panel in front of the other seats.

What is claimed is:

1. An airbag apparatus for a vehicle having an airbag inflated by a gas flowing out from an inflator having opposite ends and a gas permeable housing between said opposite ends when a deceleration of the vehicle exceeds a predetermined value for protecting an occupant in the vehicle, comprising an elongated member with at least one end fixed to an inner surface of said air bag, said inflator being fixed at at least one of said opposite ends to said elongated member and held in said air bag by said elongated member.

2. An airbag apparatus for a vehicle as claimed in claim 1, wherein said elongated member is a suspension string having one end fixed to a base end side of an inner surface of said air bag and an opposite end fixed to an apex side of said inner surface of said airbag, and said inflator is fixed at said opposite ends to a middle portion of said suspension string.

3. An airbag apparatus for a vehicle as claimed in claim 1, wherein there are two separate elongated members one of said two separate elongated members extending from an inner surface of said airbag between one of a base end side and an apex side of the airbag and the other of said two separate elongated members extending from an opposite inner surface of said airbag between said base end side and said apex side of said airbag and inner ends of said elongated members are connected, respectively, to said opposite ends of said inflator.

4. An airbag apparatus for a vehicle as claimed in claim 1, wherein means for restraining gas flow in a predetermined direction from said inflator is positioned adjacent said inflator.

* * * * *